Feb. 16, 1960    A. A. WHITE    2,924,993
MULTIPLE STEERING MECHANISM
Filed Dec. 23, 1957    3 Sheets-Sheet 1

INVENTOR.
Allen Andrew White
BY
ATTORNEY

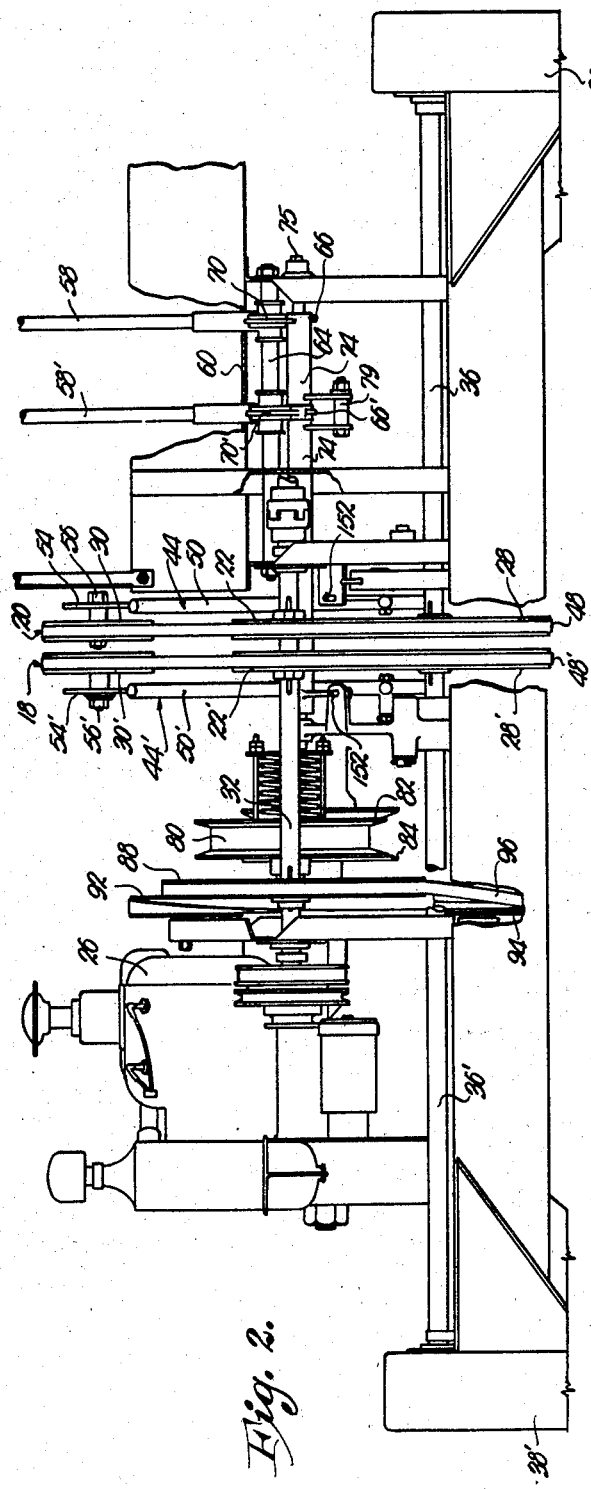

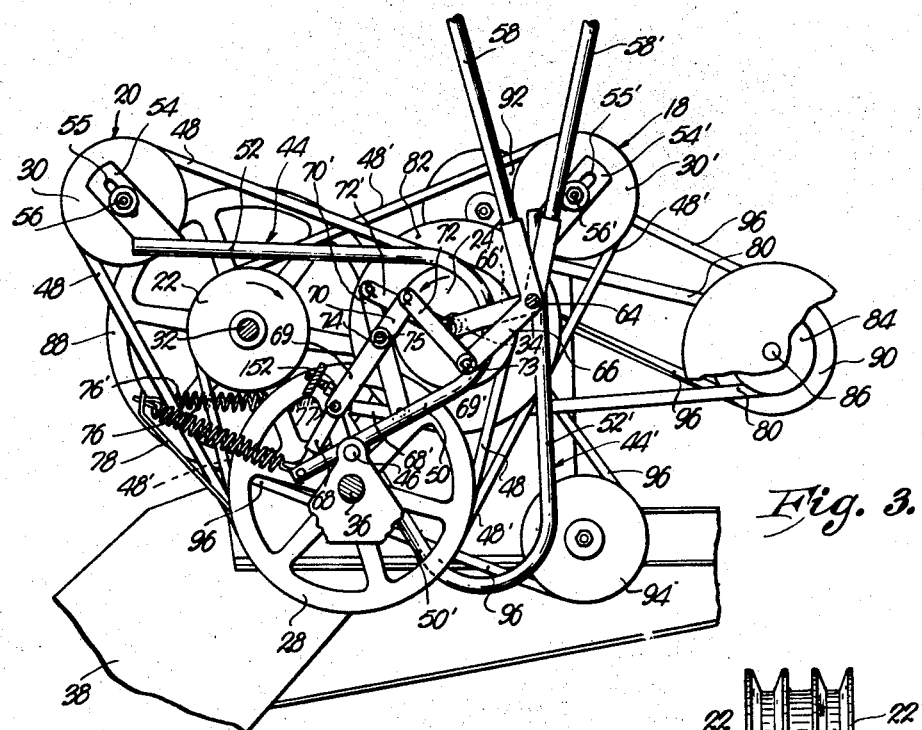

United States Patent Office 2,924,993
Patented Feb. 16, 1960

2,924,993
MULTIPLE STEERING MECHANISM

Allen Andrew White, Peabody, Kans., assignor to Hesston Manufacturing Co., Inc., Hesston, Kans., a corporation of Kansas Application December 23, 1957, Serial No. 704,386

17 Claims. (Cl. 74—722)

This invention has to do with transmission mechanism interposed between the prime mover and ground-engaging wheels of a mobile vehicle for advancing the latter in either of two directions and having incorporated therein primary steering structure as well as secondary fine-line steering apparatus, the primary object being to improve upon the teachings of my copending application Serial No. 592,083, filed June 18, 1956, this being a continuation-in-part thereof.

In my copending application above-identified, there is provided a pair of belt and pulley assemblies under the control of the operator for causing forward or reverse movement of a vehicle under the power of a prime mover as the operator manipulates a pair of swingable levers. The arrangement is such as to permit the execution of relatively sharp turns or complete rotation of the vehicle to the simple expedient of positioning the levers in proper relationship. Accordingly, it is also possible to steer the vehicle as more or less tension is applied to either of the two control belts of the aforementioned assemblies.

However, full and complete control for steering purposes is not provided through the two levers alone and, particularly, at high speeds and over rough terrain it is advisable to include the fine-line steering means as a safety factor.

Therefore, in my prior disclosure there is included a variable pulley arrangement that increases the maneuverability of the vehicle and permits a certain but adequate degree of steerability, at least in a forward direction in complete absence of manipulation of the primary levers.

The arrangement in said copending application is such however, that it became necessary for the operator to control the fine-line steering through a steering wheel separate from the swingable levers and it is, therefore, the most important object of the instant invention to provide structure that makes it possible to manipulate the variable pulley unit by laterally swinging one of the primary levers.

It is another important object of the present invention to incorporate within the primary steering mechanism above described, means in the nature of a variable pulley unit for controlling the direction of travel of the vehicle as one of the levers is swung laterally but operable irrespective of the position of such lever along its fore and aft path of travel.

It is an important aim of the present invention to provide a minute control of the aforementioned character which is primarily intended for use only during forward travel of the vehicle but which, by virtue of its inherent nature, permits the exercise of control even during execution of turns.

Other aims and objects relate to important details of construction and advantageous features, all of which will be made clear or become apparent as the following specification progresses, reference being had to the accompanying drawings wherein:

Fig. 2 is a fragmentary, front-elevational view of the steering mechanism of the implement shown in Fig. 1.

Fig. 3 is an enlarged, fragmentary view similar to Fig. 1 and partially in section illustrating the position of parts when one steering lever is swung forwardly and the other rearwardly.

Fig. 4 is an enlarged, fragmentary plan view showing the fine-line steering structure in the nature of variable speed pulley means, parts being broken away and in section for clearness.

Fig. 5 is a fragmentary, detailed, cross-sectional view taken on line V—V of Fig. 4; and Fig. 6 is an enlarged, fragmentary, cross-sectional view taken on line VI—VI of Fig. 4.

Figure 1:
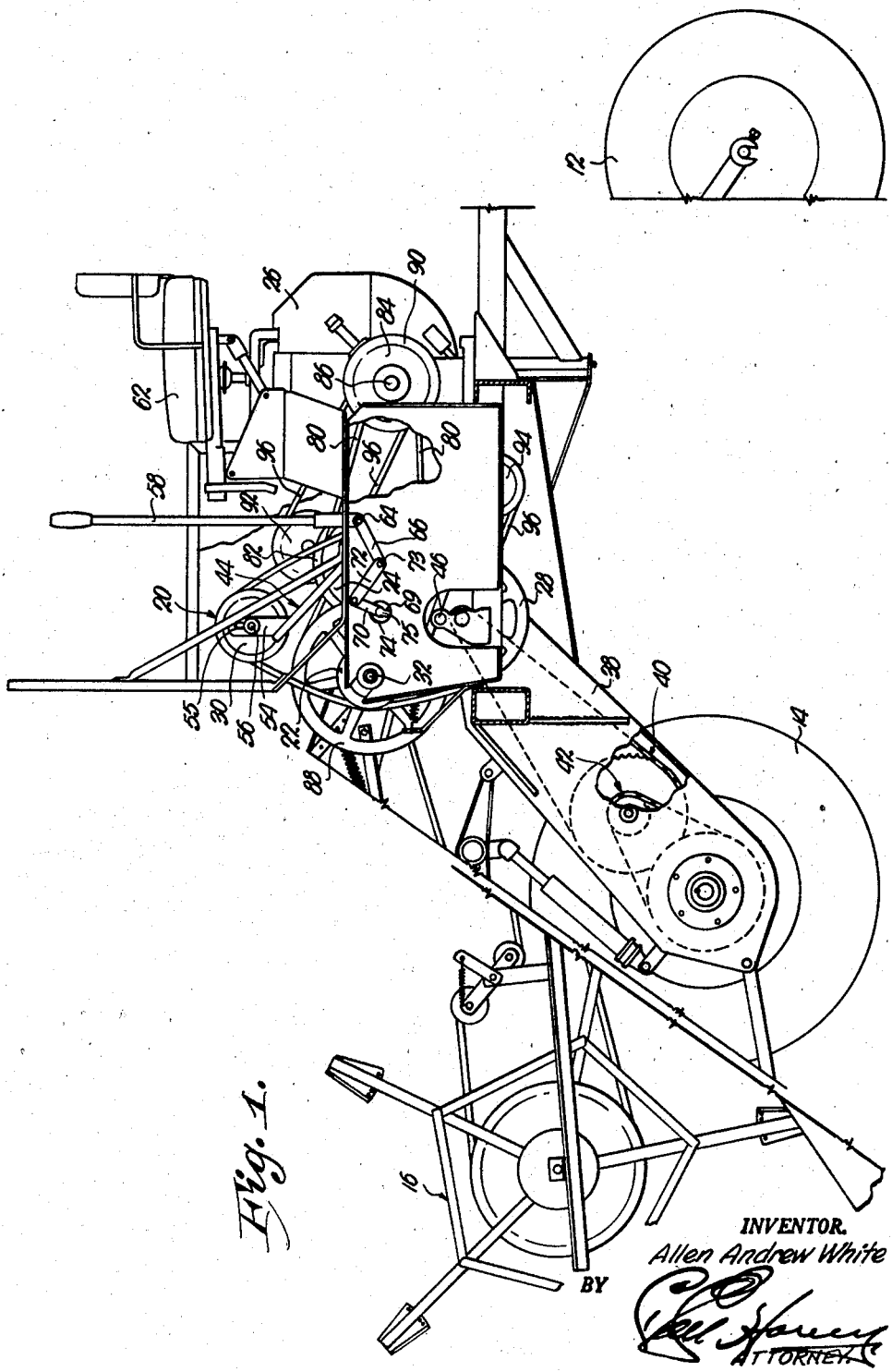
Fig. 1 is a fragmentary, side-elevational view of one type of farm implement with which the instant invention is adapted to be used, parts being broken away to reveal some of the details of construction of the multiple steering mechanism.

The implement chosen for illustration of the principles of the instant invention and included in part by Figs. 1 and 2 of the drawings, is in the nature of a swather supported in its entirety by a rear castor wheel 12 and a pair of opposed, ground-engaging drive wheels, one only of which is illustrated in Fig. 1 and designated by the numeral 14. The implement includes as a part thereof a sickle bar and platform (not shown) above which is rotatably disposed a conventional reel 16, but inasmuch as the improvements about to be described my be employed in connection with virtually any mobile vehicle, or wherever power transmission is needed, no further details of construction or operation of the implement need be set forth.

The steering structure for driving the wheels 14 either forwardly or in reverse includes a pair of primary power transmission mechanisms broadly designated by the numerals 18 and 20, and inasmuch as they are substantially identical, the unit 20, only as illustrated in Figs. 1–3 inclusive, will be described. Where duplicate parts on opposite sides are provided, such parts will bear similar numbers with one set of numbers being primed. For ease in description, only one set of numbers will be specifically referred to.

Referring especially to Fig. 3 of the drawings, the power transmission mechanism 20 includes a pair of horizontally spaced drive elements 22 and 24 that constantly rotate in opposite directions when driven by prime mover 26. A driven member 28 is disposed beneath the elements 22 and 24, preferably within a vertical plane midway between the elements 22 and 24 and an idler member 30 is spaced directly above the member 28 and above the elements 22 and 24 when the member 30 is in the neutral position shown in Fig. 1 of the drawings.

Elements 22 and 24 are secured directly to shafts 32 and 34 respectively, for rotation therewith, it being understood that the drive elements 22' and 24' of mechanism 18 are likewise secured to shafts 32 and 34 respectively for rotation therewith.

Driven member 28 is, on the other hand, attached directly to a shaft 36 operably connected with corresponding wheel 14 through the medium of structure contained within housing 38 (see Fig. 1). Such structure may consist of a pair of operably connected chain and sprocket wheel assemblies broadly designated by the numerals 40 and 42.

Looking again to Fig. 3 of the drawings, the idler member 30 is mounted on a U-shaped support 44 that is in turn swingably carried by the frame of the implement adjacent the shaft 36 by a pivot pin 46. A continuous flexible device 48 such as a belt is trained over the elements 22 and 24 and the members 28 and 30.

The drive elements 22 and 24, the driven member 28 and the idler member 30 are all preferably in the nature of pulleys disposed within a common vertical plane as seen in Fig. 2 of the drawings. Consequently, it is seen that the axes of rotation of shafts 32, 34 and 36, as well as the axis of rotation of idler pulley 30 and the axis of swinging movement of support 44 about pivot pin 46 are horizontal and in parallelism.

The support 44 for idler pulley 30 is preferably in the nature of a resilient loop having a lower leg 50 and an upper leg 52. The lower leg 50 is carried by the pivot pin 46 whereas upper leg 52 receives the idler pulley 30 through the medium of a laterally extending bracket 54 that is slotted at 55 to adjustably receive stub shaft 56 of the idler pulley 30. The tension of the belt 48 in either of the two positions of the idler pulley 30 may, therefore, be varied by shifting the idler pulley 30 with respect to the bracket 54 toward and away from the pivot pin 46.

The idler pulley 30 is swung through its path of travel about the horizontal axis of pivot pin 46 through the medium of a manually manipulable lever 58 that extends upwardly through platform 60 of the implement forwardly of the operator's seat 62. The lowermost end of the levers 58 and 58' are rotatably or hingedly mounted on a single, stationary, horizontal shaft 64 disposed beneath the platform 60 and extending toward the mechanism 20. A lateral extension 66 is rigid to the lowermost end of the lever 58 for swinging movement therewith as a unit.

Toggle linkage operably interconnecting the extension 68 and the lower leg 50 of loop 44 includes element 68 and links 69, 70, and 72, the link 70 being adjacent lever 58 beneath platform 60 and rigidly secured to a rotatable tube 74. Link 72, disposed below platform 60, pivotally interconnects the uppermost end of the link 70 with the outermost end of the extension 66 at 73, whereas the element 68 pivotally interconnects the forwardmost end of the leg 50 and the lowermost end of the link 69 at 77, link 69 being horizontally spaced from link 70 and link 69 being rigid to tube 74. It is to be noted that for the purposes of adjustment, the element 68 is extensible. A spring 76 connects the forwardmost free end of the leg 50 with a bracket 78 that is in turn carried by the framework of the implement. Tube 74 is telescoped on a rotatable shaft 75, the latter of which has horizontally spaced links 69' and 70' for lever 58' rigidly attached thereto. Note in Fig. 1 that tube 74 is connected across link 70' by a coupling 79 so that swinging movement of lever 58 is transmitted to the support 44. Link 70 is rigid to tube 74 on one side of coupling 79 and link 69 is rigid to tube 74 on the opposite side of coupling 79.

During operation of the prime mover 26, the drive pulley 24 is driven clockwise, viewing Fig. 3, through the medium of a continuous belt 80 trained over pulleys 82 and 84, secured to shaft 34 and power shaft 86, respectively, the latter of which is the drive shaft of prime mover 26. The drive pulley 22 is, however, driven anticlockwise, viewing Fig. 3, from the prime mover 26. To this end, pulleys 88 and 90 are affixed to shafts 32 and 86 respectively, and the frame of the implement carries a pair of idler pulleys 92 and 94. A continuous belt 96 is trained over the pulleys 88, 90, 92 and 94, it being seen in Fig. 2 that the pulleys 92 and 94 are offset in opposite directions with respect to two aligned pulleys 88 and 90 for preventing undue wear in the belt 96 which would otherwise occur by stretches thereof rubbing together at the point of crossing adjacent the pulley 92.

Secondary steering control structure operable in conjunction with the primary power transmission mechanisms 18 and 20 is best seen in Figs. 4–6 of the drawings. In this connection, the drive pulleys 24 and 24' are in the nature of a composite unit, including a center section 98 and a pair of outermost sections 100 and 102 yieldably biased apart by springs 103. The center section 98 is secured to the shaft 34 for rotation therewith through the medium of a set screw or the like 104, and the sections 100—102 are interconnected by a plurality of bolts 106 slidable in section 98.

The sections 100 and 102 are reciprocable or slidable on the shaft 34 toward and away from the center section 98, presenting the pulleys 24 and 24' of varying diameters, to drive the belts 48—48' and, therefore, the pulleys 28—28' at varying speeds when the belts 48—48' are in operative engagement with the pulleys 24—24' as shown in Fig. 2 of the drawings. The pressure of belts 48—48' on pulleys 24—24' keeps sections 100—102 in proper relationship.

The variable pulley unit shown in Figs. 4 and 6 is controlled by lateral swinging movement of the lever 58', irrespective of the disposition thereof fore and aft. To this end, as seen in Fig. 5, the lateral extension 66' for the lever 58' is specially formed to present a collar 126 freely rotatable on shaft 64 for fore and aft movement of the lever 58' and a tubular boss 128 underlying collar 126 in transverse relationship thereto.

Lever 58' is secured to a U-shaped yoke 130 whose legs embrace the extension 66' at the ends of the boss 128 of the latter, and a shaft 132 extending through the boss 128 swingably mounts the yoke 130 on the extension 66'.

Referring now to Fig. 6, section 102 of the multiple pulley unit has a sleeve 134 extending therefrom on shaft 34 that rotates within a bearing 136 held between shoulder 138 on sleeve 134 and set collar 140 attached to sleeve 134. An arm 142 (see Fig. 4) is secured to a clamp 144 that is releasably attached to the bearing 136.

The yoke 130 and the arm 142 are interconnected by an extensible element 146 having universal joints 148 and 150 at the ends thereof connecting with arm 142 and one leg of yoke 130 respectively.

For clearness of illustration, both of the levers 58 and 58' are shown vertical in the neutral position in Figs. 1 and 2, lever 58 is shown swung forwardly in Fig. 3, and lever 58' is illustrated in Fig. 3 of the drawings retracted to the rearmost end of its path of travel toward the operator's seat 62. Fig. 5 of the drawing shows the forward and rearward positions of the steering lever 58'.

In operation, it is clear that when the levers 58 and 58' are vertically disposed as shown in Figs. 1 and 2, belts 48 and 48' will be wrapped rather loosely around their corresponding pulleys 22—22', 24—24', 28—28' and 30—30'. Consequently, even during continuous operation of prime mover 26, driving both of the pulleys 22 and 22' clockwise viewing Fig. 1, and rotating both pulleys 24 and 24' anticlockwise, viewing Fig. 1, no rotative movement will be imparted to the pulleys 28 and 28', and therefore, shafts 36 and 36', as well as corresponding wheels 14, remain motionless.

Manifestly, the speed of operation of the prime mover 26, preferably in the nature of a gasoline engine, may be varied through conventional throttle control means (not shown), but when the two power transmission mechanisms 18 and 20 are neutral, pulleys 22—22' are driven idly from power shaft 86 through pulley 90 and belt 96 which in turn drives pulley 88 and therefore, the shaft 32 to which the two drive pulleys 22 and 22' are affixed. By the same token, the two pulleys 24—24', i.e., the composite unit shown in Figs. 4 and 6 of the drawings, will rotate idly with the shaft 34 as the latter is driven directly from the shaft 86 through pulleys 82 and 84 and belt 80.

When the diameters of the pulleys 24 and 24' are equal, belts 48 and 48' respectively, will be driven at the same rates of speed when such belts are brought into engagement with their corresponding pulleys 24 and 24'. This is accomplished by swinging both of the levers 58 and 58' forwardly to the forwardmost ends of their paths of travel. Such swinging movement of lever 58 about the shaft 64 anticlockwise, swings the extension 66 downwardly and rearwardly. Extension 66 exerts a pull upon the link 27 which in turn, by virtue of its pivotal connection with the link 70, rotates the tube 74 clockwise. As the lowermost end of the link 69 swings upwardly and forwardly, the distance between tube 74 and the outermost, forwardmost end of the leg 50 is increased. The supporting loop 44 for the idler pulley 30 is thereby swung anticlockwise about the axis of pivot pin 46 and against the action of spring 76.

The links 68 and 69 are permitted to swing slightly beyond center, i.e., beyond a straight line connecting tube 74 and the outermost free end of the leg 50 before striking an adjustable stop 152. The idler pulley 30 is therefore, releasably held in the position shown in Fig. 3 of the drawings permitting the operator to release his grip on the lever 58.

It is seen in Fig. 3 of the drawings that when the pulley 30 is disposed at the forwardmost end of its path of travel, belt 48 is brought against the pulley 24 and swung away from the pulley 22, the latter continuing to rotate clockwise, viewing Fig. 3, without any effect upon the ground wheels 14. Rotation of the shaft 34, and therefore, the pulley 102, causes rotation of the drive pulley 28 and, of course, the idler pulley 30 anticlockwise which drives the shaft 36 to rotate the wheel 14 that can be seen in Fig. 1 through the interconnection 40—42 between shaft 36 and the wheel 14. By the same token, when the lever 58' is also at the forwardmost end of its path of travel, belt 48' will be driven from pulley 24' to in turn rotate the shaft 36' and a corresponding wheel 14 forwardly in the same direction as the wheel 14 shown in Fig. 1 is driven.

At any time the operator, positioned on seat 62, desires to manipulate a turn or guide the implement to the left or to the right, it is but necessary to manipulate the levers 58 and 58'. For example, if, while lever 58 is in the forward position, the lever 58' is retracted toward the seat 62 thereby releasing the tension of belt 48' on pulley 24', the implement is caused to veer to the right because of the greater speed of travel of the wheel 14 shown in Fig. 1. If the lever 58' is moved to a neutral position while the lever 58 is at the forwardmost end of its path of travel, the wheel corresponding to shaft 36' will no longer be driven and, by virtue of continued driving of the wheel 14 shown in Fig. 1, the implement will turn about a vertical axis and continue to rotate 360° if such is desired.

When the levers 58 and 58' are in the position shown in Fig. 3, the wheel 14 shown in Fig. 1 will rotate forwardly and the ground wheel (not shown) corresponding to lever 58' will be driven in reverse, permitting a sharp right-angle turn to the right. Reversing the positions of levers 58 and 58' causes a sharp turn to the left.

It is contemplated, however, that minor turning movements in the implement may be executed independently of the levers 58 and 58', while the same are at the forwardmost ends of their paths of travel or in any other position. This is accomplished by lateral manipulation of the lever 58' since the speed of rotation of the pulley 28 is increased as soon as the pulley section 102 is shifted away from the center section 98. It is contemplated that the pulleys 24 and 24' will be of substantially the same effective diameter when the pulley sections 100—102 are equally spaced from the section 98. Consequently, lateral manipulation of the lever 58' will cause the implement to veer to the right whenever the pulley sections 100—102 are retracted to increase the diameter of pulley 24 and decrease the diameter of pulley 24'; and to the left whenever the pulley sections 100—102 are moved toward the pulley 82 to increase the diameter of pulley 24' and decrease the diameter of pulley 24.

It is manifest that levers 58 and 58' must be pulled toward the seat 62 to the neutral position shown in Figs. 1 and 2 before the implement can be placed in reverse. The reverse action is accomplished by retracting the levers 58 and 58' to the rearmost ends of their paths of travel which causes the idler pulleys 30 and 30' to swing their corresponding belts 48 and 48' to a position engaging pulleys 22 and 22' respectively.

A safety factor is provided for reverse operation in that support 44 strikes shaft 36 before the extension 66 and link 72 are permitted to closely approach alignment. Accordingly, as soon as the levers 58 and 58' are released by the operator, the springs 76 and 76' automatically return both power transmission mechanisms 18 and 20 to the neutral position.

The fine-line steering shown in Figs. 4–6 of the drawings is ineffective and not believed necessary for reverse travel and such steering in reverse may be affected by manipulation of the levers 58 and 58' toward and away from the rearmost ends of their paths of travel.

The particular nature of the supports 44—44' is extremely important. The formation thereof in substantially U-shaped loops and the utilization of somewhat resilient material in the manufacture thereof places a yieldable bias upon the corresponding idler pulleys 30 and 30' whenever the latter are either at the forwardmost or rearward ends of their paths of travel. Viewing Fig. 3 for example, it is seen that belt 48 is kept in a taut condition tightly engaging not only the drive pulley 24, but the driven pulley 28 and as the leg 52 tends to yield toward the leg 50, the resiliency within the bight of the loop 44 will tend to bias the pulley 30 upwardly and forwardly away from the pivot point 46, thereby maintaining the belt 48 stretched to its limit provided, of course, that the pulley 30 is properly adjusted with respect to its supporting bracket 54. The same effect of the loop 44' upon the belt 48' is apparent in Fig. 3 when the idler pulley 30' is disposed, as shown, to hold the belt 48' tightly against the drive pulley 22'.

It is important to note that the variable pulley unit shown in Figs. 4 and 6 may be controlled by lateral swinging movement of the lever 58' as illustrated in Fig. 4, irrespective of the fore and aft position of lever 58' as shown in Fig. 5. Primarily the variable pulley unit will be controlled through such lateral movement of lever 58' when both levers 58 and 58' are swung forwardly, thereby driving both ground wheels at the same rate because of the fact that pulleys 24 and 24' are on the same shaft 34 driven from prime mover 26 through belt 80. However, even when lever 58' is pulled rearwardly to slacken its belt 48' in pulley 24', or to a neutral position where pulley 24' rotates freely with respect to belt 48', or to a fully retracted position where belt 48' engages pulley 22', it is possible to swing the lever 58' laterally as shown in Fig. 4.

Thus, even if lever 58' is in a position where variance in the size of the pulley 24' has little or no effect upon belt 48', nevertheless, such lateral movement of the lever 58' will have an effect upon the belt 48 by virtue of the variance in the diameter of the pulley 24. It follows that as long as lever 58 is in a position where pulley 24 drives the belt 48, the speed of rotation of ground wheel 14 in the forward direction, may be controlled by varying the diameter of pulley 24 irrespective of the position of lever 58 along its fore and aft path of travel. The entire fine-line steering control is affected therefore, through the lever 58' by virtue of the double-joint arrangement shown in Fig. 5 and the operable connection between yoke 130 and the pulley unit shown in Figs. 4 and 6.

It is manifest also that while the variable pulley arrangement shown in Figs. 4 and 6 consists of a composite unit, the concepts of the instant invention do not preclude a construction wherein only one of the pulleys 24 or 24' is variable, or a construction wherein both are variable as illustrated but operating under separate controls. In the last mentioned instance, both levers 58 and 58' might be rendered laterally swingable for controlling the diameters of their corresponding pulleys 24 and 24' respectively.

It is additionally apparent that no such variable pulley arrangement has been provided on the shaft 32 inasmuch as fine-line steering is not believed necessary for reverse travel. But, pulleys 22 and 22' might well be rendered variable in the manner shown by Figs. 4 and 6 for example, and controlled by lever 58 by an arrangement for the latter similar to the arrangement illustrated in Fig. 5.

Having thus described the invention what is claimed as new and desired to be secured by Letters Patent is:

1. In a power transmission, rotatable means having a pair of variable speed members mounted thereon for rotation therewith; a rotatable structure for each member respectively; a flexible device operably connecting each member respectively with a corresponding structure; apparatus for shifting the devices into and out of engagement with the members; and mechanism common to the members for varying the latter to alternately increase the speed of one device while decreasing the speed of the other device, and decrease the speed of said one device while increasing the speed of the other device.

2. In a power transmission, rotatable means having a pair of variable speed members mounted thereon for rotation therewith; a rotatable structure for each member respectively; a flexible device operably connecting each member respectively with a corresponding structure; shiftable apparatus for each device respectively for selectively shifting the same into and out of engagement with the members; movable mechanism common to the members for varying the latter to alternately increase the speed of one device while decreasing the speed of the other device, and decrease the speed of said one device while increasing the speed of the other device; and means coupling one of said apparatuses with said mechanism for moving the latter.

3. In a power transmission, rotatable means having a pair of variable speed members mounted thereon for rotation therewith; a rotatable structure for each member respectively; a flexible device operably connecting each member respectively with a corresponding structure; shiftable apparatus for each device respectively for selectively shifting the same into and out of engagement with the members; mechanism common to the members and including manual means swingable in one direction along a first path of travel for varying the members to alternately increase the speed of one device while decreasing the speed of the other device, and decrease the speed of said one device while increasing the speed of the other device, said manual means being swingable in another direction along a second path of travel; and means coupling said manual means with the apparatus of one of said devices for shifting the latter as the manual means is swung along said second path of travel.

4. In power transmission mechanism, a first drive member; a second variable speed drive member spaced horizontally from said first drive member; means for rotating the members in opposite directions; a driven member beneath the drive members; a U-shaped, resilient loop having an upper and a lower leg; pivot means adjacent the driven member mounting the lower leg for swinging movement of the loop; an idler member normally disposed above the drive and driven members within a vertical plane common thereto, said idler member being mounted on the upper leg for rotation on a horizontal axis parallel with the axes of rotation of the drive and driven members and with the axis of swinging movement of said loop; a continuous flexible device trained over the members; and manually manipulable structure connected with said second drive member for varying the speed of the latter and connected with said loop for swinging the same to force the device against either of said drive members whereby to rotate the driven member in either direction.

5. In power transmission mechanism, a first drive member; a second variable speed drive member spaced horizontally from said first drive member; means for rotating the members in opposite directions; a driven member beneath the drive members; a U-shaped, resilient loop having an upper and a lower leg; pivot means adjacent the driven member mounting the lower leg for swinging movement of the loop; an idler member normally disposed above the drive and driven members within a vertical plane common thereto, said idler member being mounted on the upper leg for rotation on a horizontal axis parallel with the axes of rotation of the drive and driven members and with the axis of swinging movement of said loop; a continuous flexible device trained over the members; manually swingable means; means connecting the manual means with said second drive member for varying the speed of the latter; and toggle means connecting the manual means and said lower leg for swinging the loop in response to swinging of the manual means to force the device against either of said drive members whereby to rotate the driven member in either direction.

6. In power transmission mechanism, a pair of horizontally spaced drive members; a prime mover having rotatable means; means interconnecting the rotatable means and one of the drive members for rotating the latter in one direction; means interconnecting the rotatable means and the other drive member for rotating the latter in the opposite direction, and including a variable speed structure for rotating the latter in the opposite direction, and including a variable speed structure on the rotatable means for varying the speed of rotation of said drive members; a driven member beneath the drive members; a U-shaped, resilient loop having an upper and a lower leg; pivot means adjacent the driven member mounting the lower leg for swinging movement of the loop; an idler member normally disposed above the drive and driven members within a vertical plane common thereto, said idler member being mounted on the upper leg for rotation on a horizontal axis parallel with the axes of rotation of the drive and driven members and with the axis of swinging movement of said loop; a continuous flexible device trained over the members; and manually manipulable mechanism connected with said loop for swinging the same to force the device against either of said drive members whereby to rotate the driven member in either direction.

7. In a power transmission, a pair of spaced-apart rotatable drive elements; a pair of spaced-apart rotatable members; a continuous flexible device trained over the elements and the members, one of the members being movable in one direction to shift the device against one of the elements for rotation of the members and the one element together as a unit, and in the opposite direction to shift the device against the other element for rotation of the members and the other element together as a unit; mechanism for varying the speed of travel of said device when the same is against said one element; manual control structure shiftable in a plurality of directions; means operably coupling said structure with said one member for moving the latter when said structure is shifted in one direction; and means operably coupling said structure with said mechanism for actuating the latter when said structure is shifted in another direction.

8. In a power transmission, a rotatable drive element; a pair of spaced-apart rotatable members; a continuous flexible device trained over the element and the members, one of the members being shiftable to and from a position shifting the device against said element for rotation of the members and the element together as a unit; mechanism for varying the speed of travel of said device when the same is against said element; manual control structure shiftable in a plurality of directions; means operably coupling said structure with said one member for moving the latter when said structure is shifted in one direction; and means operably coupling said structure with said mechanism for actuating the latter when said structure is shifted in another direction.

9. In a power transmission, a pair of spaced-apart rotatable drive elements; a rotatable driven member; a continuous flexible device trained over the elements and the member; apparatus movable in one direction to shift the device against one of the elements for rotation of the member and the one element together as a unit, and in the opposite direction to shift the device against the other element for rotation of the member and the other element together as a unit; mechanism for varying the speed of travel of said device when the same is against said one element; manual control structure shiftable in a plurality of directions; means operably coupling said structure with said apparatus for moving the latter when said structure is shifted in one direction; and means operably coupling said structure with said mechanism for actuating the latter when said structure is shifted in another direction.

10. In combination with a prime mover, a pair of power transmission mechanisms, each including a pair of spaced-apart drive elements, means operably connecting the elements with said prime mover for rotating the elements in opposite directions, a rotatable driven member spaced from said elements, a rotatable idler member spaced from said elements and from said driven member, a continuous flexible device trained over the elements and the member, and means for moving the idler member in one direction to force the device against one of the elements and thereby drive the driven member clockwise, and for moving the idler member in the opposite direction to force the device against the other element and thereby drive the driven member anticlockwise; and means for varying the speeds of travel of the devices while the members are driven in one direction.

11. In combination, rotatable power means; and a pair of power transmission mechanisms, each including a forward, variable speed drive member and a reverse drive member, a driven member beneath the drive members, an idler member normally disposed above the drive and driven members within a vertical plane common thereto, a support for the idler member, pivot means swingably mounting the support, said idler member being mounted on the support for rotation on a horizontal axis parallel with the axes of rotation of the drive and driven members and with the axis of swinging movement of said support, a continuous flexible device trained over the members, and manually swingable means operably connected with said support for swinging the latter to force the device against either of said drive members; a first drive mechanism common to the forward drive members; a second drive mechanism common to the reverse drive members; means coupling the rotatable power mean with the first drive mechanism for driving the latter in one direction; means coupling the rotatable power means with the second drive mechanism for driving the latter in the opposite direction; and structure coupled with said forward drive members for actuating the same to vary the speed of travel of the devices when the same are against the forward drive members.

12. In combination, a pair of power transmissions, each including a drive structure, a variable speed drive member, a driven element, a shiftable idler, and a flexible device trained around the structure, the member, the element and the idler; means connected with the members and the structures in the opposite direction; manual means operably coupled with each idler respectively, said manual means being swingable fore and aft whereby to shift the idlers and thereby alternately engage the devices with either the structures or the members, one of the manual means being swingable laterally; and mechanism connecting the one manual means with said members to actuate the latter and vary the speeds of the devices when the latter are in engagement with the members and as the one manual means is swung laterally.

13. The invention of claim 12, said mechanism operably interconnecting the members whereby when the one manual means is swung laterally in one direction the speed of one device will be increased and the speed of the other device will be decreased, and when the one manual means is swung laterally in the opposite direction the speed of the one device will be decreased and the speed of the other device will be increased.

14. The invention of claim 12, there being a first drive means common to the structures, a second drive means common to the members and a driven means common to the elements.

15. In a vehicle having a pair of rotatable ground mechanisms, a power transmission for each mechanism respectively, each transmission including a drive structure, a variable speed drive member, a driven element operably coupled with a corresponding mechanism, a shiftable idler, and a flexible device trained around the structure, the member, the element and the idler; means connected with the members and the structures for rotating the members in one direction and the structures in the opposite direction; manual means operably coupled with each idler respectively, said manual means being swingable fore and aft whereby to shift the idlers and thereby alternately engage the devices with either the structures or the members to drive either or both mechanisms forwardly or rearwardly, or in opposite directions, one of the manual means being swingable laterally; and means connecting the one manual means with said members to actuate the latter and vary the speeds of the devices when the latter are in engagement with the members and as the one manual means is swung laterally for steering the vehicle when the same is traveling in one direction.

16. In a vehicle having a pair of rotatable ground mechanisms, a power transmission for each mechanism respectively; also having a pair of operator control levers, both of which are swingable forwardly and backwardly, one of the two being swingable laterally in all positions of its forward and backward movement; these levers being provided with means to connect them with said power transmission; the movement of one lever forwardly and backwardly controlling the rotation of the corresponding mechanism; the movement of the other lever forwardly and backwardly controlling the rotation of the other corresponding mechanism; the movement of one of the levers laterally controlling the differential of rotation between the two mechanisms.

17. In a vehicle having a pair of rotatable ground-engaging mechanisms, a power transmission operably coupled with each mechanism respectively; a pair of operator control members, each movable forwardly and rearwardly, one of the members being movable laterally in all positions of its forward and rearward movement; means operably connecting the members with said power transmissions for controlling the rotation of one of said mechanisms upon movement of one of said members forwardly and rearwardly, and for controlling the rotation of the other mechanism upon movement of the other member forwardly and rearwardly; and means operably coupling said one member with said power transmissions for controlling the differential of rotation between the two mechanisms upon movement of said one member laterally.

References Cited in the file of this patent
UNITED STATES PATENTS

| | | |
|---|---|---|
| 2,311,393 | Honeywell | Feb. 16, 1943 |
| 2,420,100 | Salsbury | May 6, 1947 |
| 2,664,757 | Shaw | Jan. 5, 1954 |
| 2,756,615 | Kantz | July 31, 1956 |

FOREIGN PATENTS

| | | |
|---|---|---|
| 172,528 | Austria | Sept. 25, 1952 |
| 493,078 | Canada | May 26, 1953 |